July 18, 1933.  J. N. LAYCOCK  1,918,478
SEALING GASKET
Filed Feb. 13, 1931   2 Sheets-Sheet 1

Inventor
J. N. Laycock
Wilkinson & Mawhinney
Attorneys.

July 18, 1933. J. N. LAYCOCK 1,918,478
SEALING GASKET
Filed Feb. 13, 1931 2 Sheets-Sheet 2
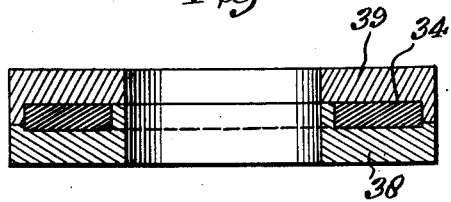
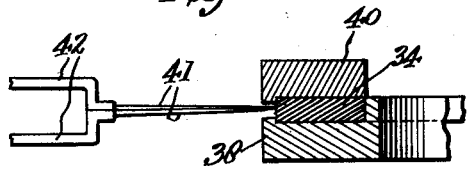
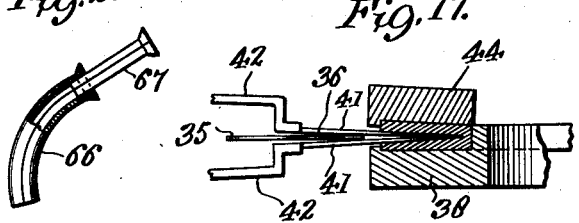
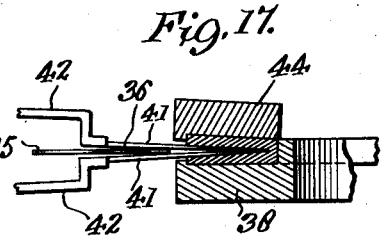
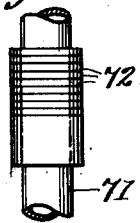
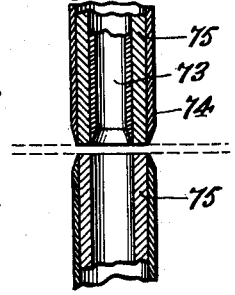
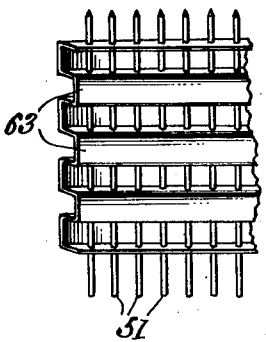
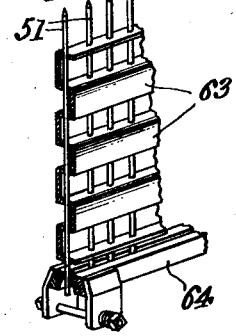
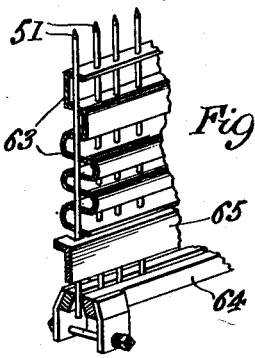
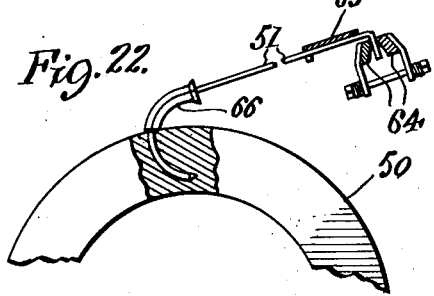
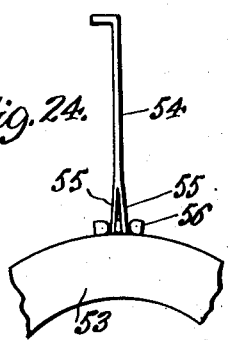
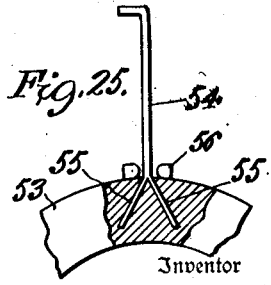
Inventor
J. N. Laycock
By Wilkinson & Mawhinney
Attorneys.

Patented July 18, 1933

1,918,478

UNITED STATES PATENT OFFICE

JOHN NOBLE LAYCOCK, OF PORT AU PRINCE, HAITI

SEALING GASKET

Application filed February 13, 1931. Serial No. 515,833.

The present invention relates to closures, particularly for jars and the like, which are equipped with screw caps, or caps of the type adapted to be sealed upon the jar neck.

An object of the present invention is to provide a gasket for use between the cap and the shoulder at the base of the jar neck for sealing the cap in place and to provide such gasket with means facilitating the ready removal thereof in opening the jar.

Another object of the invention is to provide a gasket of this type with a handle or projection so constructed and mounted upon the gasket that it will not interrupt or disfigure the opposed sealing faces of the gasket, and which will effect the desired displacement of the gasket when the handle or projection is drawn outwardly from beneath the flange of the cap.

A further object of the present invention is to provide a method in the manufacture of gaskets with the handles or projections thereon, so that the handles or projections may be grouped in the gasket structure during the final stages in the manufacture thereof and so that the gaskets may be handled in multiple in placing the handles or projections on the gaskets.

With the foregoing and other objects in view, the invention will be more fully described hereinafter and will be more particularly pointed out in the claims appended hereto.

In the drawings, wherein like symbols refer to like or corresponding parts throughout the several views, Figure 1 is a front elevation of one type of jar and cap therefor having a sealing gasket, constructed according to the present invention, applied thereto.

Figure 15 is a vertical transverse section taken through a mold showing the gasket therein.

Figure 16 is a fragmentary sectional view through one side of the mold adjusted for the reception of the slitting knives shown about to enter the formed gasket.

Figure 17 is a like view with the knives in position and separated, and with the handle partly inserted in the gasket.

Figure 18 shows a plurality of handle wires arranged in group form ready for insertion in multiple in a plurality of gaskets according to the method shown in Figures 16, 17, 22, 24 and 25.

Figure 19 is a sectional, framentary, perspective view of the handle wires arranged in multiple and engaged by the multiple clamp employed.

Figure 20 is a like view showing the separating comb in position on the handle wires.

Figure 21 is a transverse section taken through the multiple clamp showing the handle wires therein and bent at right angles ready for insertion in the gasket.

Figure 22 shows the method of inserting the handle wires in multiple in a plurality of the molded gaskets and showing one of the curved guides for introducing the wires.

Figure 23 is an enlarged side elevation, partly in section, of one of the guides for the handle wires.

Figure 24 shows the application of the spreader die as applied to the handle wire of Figure 10, and showing the method of introducing the handle wire into the edge of the gasket.

Figure 25 is a view similar to Figure 24, but showing the handle wire in position and the die shifted ready for removal.

Figure 26 is a fragmentary side elevation of a core rod carrying a plurality of gaskets constructed according to the present invention and ready for the reception of handle wires in accordance with the methods above illustrated, and Figure 27 is a vertical section taken through a combined punching and clamping device used for cutting the washers and clamping the same during the application of the handles thereto.

Figure 1:
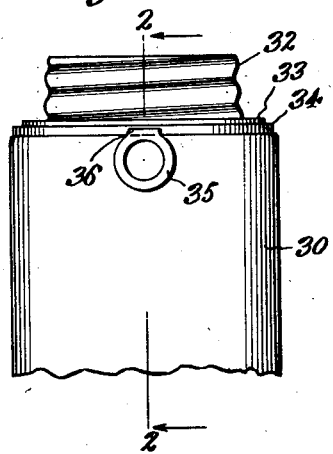
Figure 3:
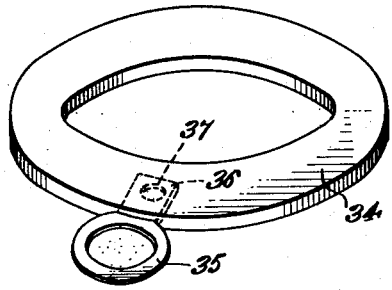
Figure 3 is an enlarged perspective view of a gasket with its handle constructed according to the present invention.
Figure 14:
Figure 14 is a perspective view of a removable handle adapted for use in connection with gaskets of usual construction.
Figure 2:
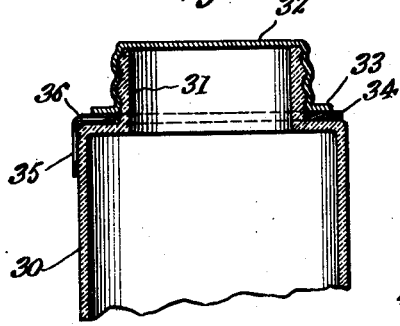
Figure 2 is a vertical section taken through the same.

Referring now to the drawings, and first to the construction shown in Figures 1, 2 and 3, 30 designates a jar or container of any approved construction, which is provided with a reduced upstanding neck 31 which may be externally threaded for the reception of a cap 32 which has its side wall correspondingly threaded and provided at its lower end with a foot or sealing flange 33. Beneath the flange 33 is disposed a sealing gasket 34 of rubber, rubber composition, or other suitable compressible material adapted to be compressed between the foot flange 33 of the cap and the upper shoulder of the container 30, as shown in Figures 1 and 2.

This gasket 34 is adapted to be removed or broken away from beneath the foot flange 33 to break the vacuum within the cap 32 and facilitate the removal of the cap from the neck 31 of the container. To effect this, the gasket 34 is provided at one side with a handle 35 and, as clearly shown in Figures 1 and 2, the handle 35 may be of ring shape adapted to receive a finger therethrough or to facilitate the grasping of the handle between the thumb and index finger for the purpose of tearing away or disrupting the gasket 34. The handle 35 is provided with a shank portion 36 which is preferably in the form of a tab of a thickness considerably less than that of the gasket 34, and which may be provided with an aperture 37, or the like, adapted to provide upper and lower interrupted surfaces to the tab 36 for the free expansion of the rubber or other material of the gasket 34 during the final stages of compression and vulcanization in the manufacture of the gasket. The handle 35 and its tab 36 may be constructed of sheet metal and may be introduced edgewise into the outer edge of the gasket 34 in any desired manner, such as in the manner shown in Figures 15, 16 and 17. In Figure 15, the gasket 34 is shown in its initially compressed and molded condition between the die plates 38 and 39, the latter being of annular construction. After the gasket 34 is initially shaped, the upper die plate 39 is removed and a retaining block 40 is substituted therefor, as shown in Figures 16 and 17, for holding the gasket 34 to shape that portion in which the handle is to be inserted.

It will be noted that the lower die plate 38 and the block 40 are provided at their outer edges with shallow flanges adapted to partly overlap the outer edge of the gasket 34, so as to protect the edges of the gasket and direct the introduction of the handle into the gasket intermediate the upper and lower surfaces thereof. A pair of slitting knives 41 are carried upon the handles 42 or the like, and are tapered in thickness toward their outer ends and are disposed in face engagement with each other and introduced against the edge of the gasket 34 between the die plate 38 and the block 40. These knives 41 are forced into the edge of the gasket 34 to a considerable extent, such as shown in Figure 17, and then the handles 42 are separated or moved apart so as to diverge or spread the adjacent ends of the knives 41 and provide a space into which the tab 36 of the handle 35 may be introduced, so that the tab 36 will enter the slit, which is formed edgewise in the gasket 34. When the tab 36 is in position, the knives 41 are withdrawn, and the gasket 34 is then submitted to compression and heat between the mold dies 38 and 39, so as to complete the operation of manufacture of the gasket and integrally unite the tab 36 in the body portion of the gasket.

Figure 4:
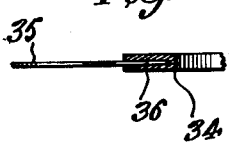
Figure 4 is a fragmentary transverse section taken through one side of the gasket, showing the handle mounted therein.

Figure 4 shows the handle embedded in the finished gasket.

Figure 6:
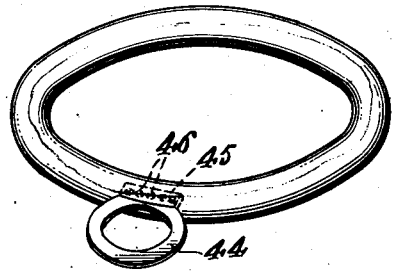
Figure 6 is a perspective view of the modified form of gasket, with its handle as shown in Figure 5.
Figure 5:
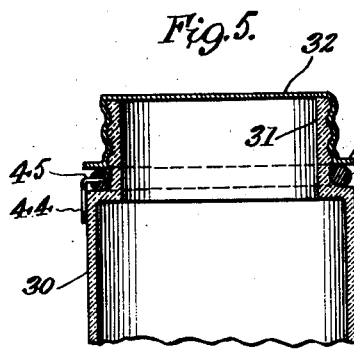
Figure 5 is a vertical section taken through the upper portion of a jar with its closure, and provided with a slightly modified form of gasket.
Figure 7:
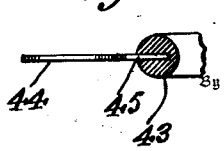
Figure 7 is a transverse section taken through one side of the modified form of gasket of Figures 5 and 6 and showing the handle therein.

With reference now to Figures 5, 6 and 7, the gasket 43, instead of being flat, as shown at 34 in Figure 2, may be round in cross section and provided with the handle in one side thereof, as above shown, the handle 44 being also of ring structure but provided with a tab 45, which is relatively short and broad to correspond with the diameter of the gasket 43 and which may be provided with a plurality of openings or indentations 46 adapted to interrupt the surfaces of the tab, so that the tab will interlock with the material of the gasket during the final stages of compression and vulcanization.

Figure 8:
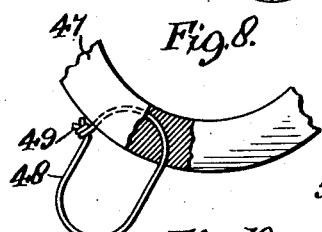
Figure 8 is a fragmentary plan view, partly in section, of another modified form of gasket and handle therefor.

In Figure 8, the gasket 47 is shown as of flat form and provided with a handle 48 in the form of an oblong loop of wire having its ends twisted or secured together at 49 at one side of the loop. One end portion of the loop is secured or threaded through the side of the gasket 47 in edgewise relation thereto, so as to project out from the side of the gasket 47 in a manner similar to that shown in Figure 7.

Figure 9:
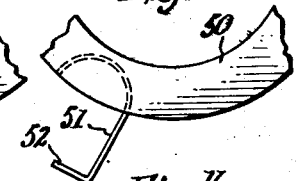
Figure 9 is a similar view showing a further modification in the construction of handle.

In Figure 9, the gasket 50 is provided with a handle 51 in the form of a length of wire curved at its inner end, as shown in Figure 8, but having its other end extending straight out substantially radially to the gasket 50 and being bent abruptly to one side to provide a finger 52. The straight portion 51 forms the handle proper and may be bent down against the side of the jar 30, such as shown in the forms of the invention of Figures 1, 2 and 5.

Figure 10:
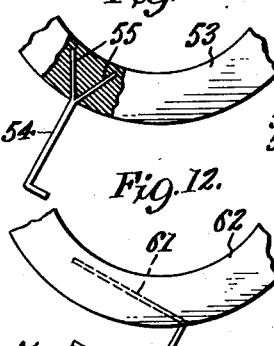
Figure 10 is a like view showing a still further modified form of handle.

Figure 10 shows the gasket 53 with a handle 54. The handle is in the form of a length of wire which is branched at its inner end to provide diverging arms 55 embedded in an edgewise direction in the gasket 53. As shown in Figures 24 and 25, the handle 54 normally has its branches 55 constructed by splitting the inner end of the handle and spreading the branches thereof by means of a die plate 56. The die plate 56 is placed against the exposed edge of the gasket 53 somewhat in the manner, as shown in Figures 16 and 17.

The handle 55 is forced inwardly through the die plate 56, and the branches 55 are spread in the manner shown in Figure 25, so that when the die plate 56 is removed, the branches 55 of the handle 54 are left in the gasket and are molded therein during the finishing steps of the manufacture of the gasket.

Figure 11:
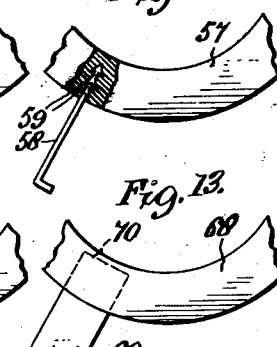
Figure 11 is another fragmentary plan view of the gasket showing a further modified form of handle therein.

Figure 11 shows the gasket 57 having a handle 58 of substantially the same construction, as shown in Figure 10, but with the inner end of the handle 58 provided with a plurality of spurs 59 which are embedded in the material of the gasket and integrally associated therewith during the final steps of compression and application of heat.

Figure 12:
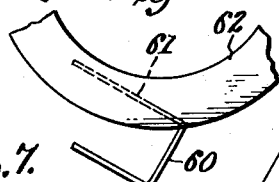
Figure 12 is a like view showing a still further modified form of handle.

In Figure 12, the handle 60 is in the form of a length of wire bent substantially U-shape with one arm 61 of greater length than the other, and with the long arm 61 inserted at a suitable angle and in an edgewise direction into the body portion of the gasket 62. The short arm of the wire handle 60 is spaced from the adjacent edge of the gasket to provide a suitable finger-hold for use in tearing the gasket 62 from beneath the cap.

The method of introducing the wire handles into the edges of the partially molded and constructed gaskets is shown to advantage in Figures 18 to 23. In the method, according to this invention, a plurality of wires, such as 51 of Figure 9, is mounted on a carrier 63 which may be of paper or other relatively light and bendable material.

The carrier 63 is crimped, as shown in Figures 18, 19 and 20, and serves to properly space apart and carry a large number of the wires 51. The wires 51 are spaced apart a distance equal to the spacing apart of the central edge portions of the gasket 50 or the like, to which the handles are to be applied. As shown in Figure 19, the lower or inner exposed ends of the wires 51 are engaged by a spring clamp 64 having elongated jaws engaging against the opposite sides of the series of wires. The opposite or outer ends of the wires are preferably pointed to facilitate penetration. After the clamp 64 is applied to the inner ends of the wires 51, a comb 65 is brought into engagement with the inner ends of the wires 51 slightly above the clamp 64. The comb 65 comprises a strip adapted to engage against the wires at one side thereof. The strip has an overturned slotted or apertured flange providing the comb teeth with the slots or apertures spaced apart to register with the respective wires 51.

The wires, thus clamped and held apart in properly spaced relation by the comb 64, have the carrier 63 stripped or removed therefrom, and the comb 65 is then turned down to one side of the clamp 64, as shown in Figure 21, to provide angular formations or projections upon the inner ends of the wires. The comb 65 is maintained in contact with the wires 51 while the pointed or outer ends of the wires 61 are forced into the edge portion of the partly molded gasket 50.

Where the wires 51 are adapted to be rounded or bent so as to engage in the gasket 50 in a manner similar to that shown in Figure 9, a curved guide 66 is employed for each wire and which is in the form of a tube of the desired length and curvature adapted to be seated at one end against the edge of the gasket 50 and held there during the movement of the wire 51 into and through the tube 66, the tube 66 bending the wire as the latter enters and passes through the tube. The wire, by virtue of its inherent rigidity, maintains the curved condition, and the wire is thus gradually formed into a section of a ring as it is forced into the partly molded gasket. This is shown to advantage in Figure 22. If it is desired to strengthen the wire 51 and hold it straight at its point of entry into the tube 66, the tube 66, as shown in Figure 23, may be provided with a supplemental straight section 67 providing a mouth adapted to first receive the wire and guide and hold it during its passage into and through the curved tube 66.

Figure 13:
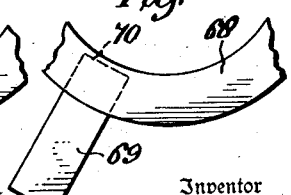
Figure 13 is a fragmentary top plan view of another modification of the handle applied to the gasket.

According to the form of the invention shown in Figure 13, the gasket 68 is provided with a handle 69 in the form of a flat strip of suitable material having one end 70 comprising the tab which is inserted and embedded in the gasket from the outer edge thereof. The tab 69 may, of course, be of the same material as the gasket and of sufficient thickness and strength to insure the displacement or tearing and breaking of the gasket. In the latter case, the tab 70 is optional.

The gaskets may be stamped and cut and mounted upon a central supporting tube 71, shown in Figure 26 at 72, so that the gaskets are disposed in superposed relation, and they may be held in such position during the introduction of the gang wires 51 into the gaskets in an edgewise direction, as above described.

In Figure 27, a combined punch and holder is provided for the gaskets. The punch comprises an inner cutting tube 73 adapted to cut the central portion of the stock to form the central opening of the gasket. An outer cutting tube 74 is spaced about the tube 73 a distance equal to the width of the gasket and is adapted to cut the stock on the outer marginal edge of the gasket. An intermediate clamping sleeve 75, formed in upper and lower sections, is disposed between the cutting sleeves 73 and 74 and is adapted to be brought into play during the cutting operation and to remain in clamping position against the upper and lower faces of the gasket to the desired extent during the introduction of the wires or other devices forming the handles.

It will be noted that in all forms of the invention, the gasket is provided with a handle which projects in an edgewise direction from one side thereof, and that this handle may be made of the same material as the gasket or of different materials therefrom, and that the mounting of the handle on the gasket does not interrupt or disturb the upper and lower sealing faces of the gasket, nor does it change the thickness of the gasket at the point of connection of the handle thereto, nor does it materially reduce the uniformity of the elasticity of the gasket in the direction of the pressure of the cap or in the tangential direction in which the gasket might require to be stretched in being placed over the neck of the container.

The gasket is applied in the usual manner of applying gaskets by fitting it over the neck 31 of the jar or container and then screwing down the cap 32 to engage the gasket and compress it against the shoulder at the base of the neck 31. Of course, the gasket may be used with any type of container and cap, as the screw cap is merely shown as of a common type. The gasket is provided with upper and lower free and unobstructed surfaces to effect sealing, and the gasket is of uniform thickness throughout its entire body portion. The handle, such as 35 in Figures 1, 2, 3 and 4, may be bent down against the side of the jar or container 30 out of the way so that the jars or containers may be readily packed and shipped and handled in the usual manner of packaging and handling this type of jar.

When it is desired to open a jar, it is only necessary to bend the handle 35 upwardly so as to extend it out at an angle sufficient for grasping, and the handle is then pulled or suitably twisted so as to pull and draw the adjacent portion of the gasket 34 from beneath the foot flange 33, the pressure being sufficient to either expand the gasket for freeing it from beneath the flange 33, or breaking and tearing the gasket sufficiently to release the air seal within the cap 32. The cap 32 may then be readily removed without the application of undue pressure.

It will be obvious that various changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:

1. A gasket comprising an annular body portion, and a handle therefor, said handle having a bent inner end embedded in the body portion, the handle projecting from the edge of the gasket.

2. A gasket comprising a ring-like body portion, and a handle therefor, said handle having a curved inner end inserted through the edge of the body portion and embedded in such body portion, the handle projecting from the edge of the gasket.

JOHN NOBLE LAYCOCK.